July 9, 1963 E. RIEDL 3,097,019
ELECTROPNEUMATICALLY OPERATING BRAKE SYSTEM
Filed Dec. 17, 1959
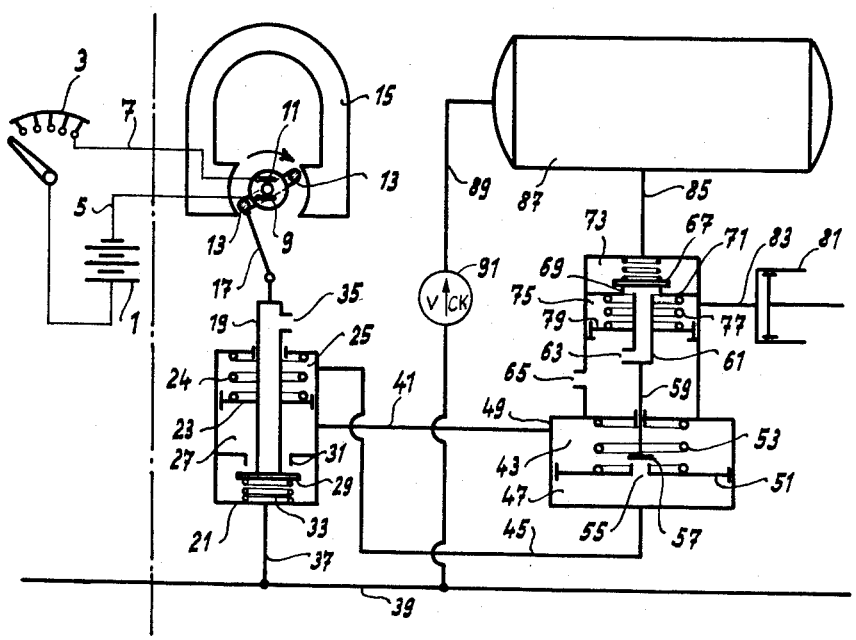
Inventor
ENGELBERT RIEDL
By Toulmin & Toulmin
Attorneys United States Patent Office 3,097,019
Patented July 9, 1963

3,097,019
ELECTROPNEUMATICALLY OPERATING
BRAKE SYSTEM
Engelbert Riedl, Munich, Germany, assignor to Knorr-Bremse Gesellschaft mit beschrankter Haftung, Munich, Germany
Filed Dec. 17, 1959, Ser. No. 860,268
4 Claims. (Cl. 303—20)

The present invention relates to an electropneumatically operating brake system. More in particular, the present invention relates to a brake system specially adapted for rail vehicles.

It is known in the art to provide a brake system for rail vehicles comprising a control unit operating a control valve for adjusting the pressure in the brake cylinder and to operate the control unit electrically. For this purpose electro-magnetic means were used comprising a coil and a moveable core, the coil being excited by a current depending on a voltage preselected by the engine driver. The force excited on the core varies according to the current intensity and thus various forces are applied to the control unit.

The use of such coil and core or lifting magnet arrangements is greatly disadvantageous because of the high power consumption. In addition, the produced force is a non-linear function of the current intensity which renders a satisfactory and accurate operation of the braking system very difficult. Furthermore, the produced force is very disadvantageously depending on the air gap with the excitation being equal. The same disadvantages apply where the force of the lifting magnet is directly and mechanically transmitted to the brake shoes so as to move the same with respect to the wheel.

With the foregoing in mind it is an object of the present invention to provide a brake system particularly for rail vehicles comprising electrical means for producing indirectly the required braking forces which has a very small power consumption.

It is another object of the present invention to provide a brake system particularly for rail vehicles comprising electrical means for producing indirectly the required braking forces, wherein the produced force is a linear function of the current intensity supplied to the electric unit.

These objects as well as further objects and advantages which will become apparent as the description proceeds are accomplished by the braking system of the present invention according to which an electric circuit is provided controlling the braking forces as a function of voltage and current intensity, which circuit comprises means for providing a magnetic field and conductor means rotatably disposed in the magnetic field, with the magnetic field producing means and the conductor means forming an electro-dynamically operating force-producing system wherefrom the braking forces are obtained indirectly.

The invention will be better understood upon the following description of the accompanying drawing, wherein:

The FIGURE is a schematic view, partly in section, of the brake system of the present invention, wherein the braking forces are obtained indirectly from the electrodynamically operating force-producing system.

The invention will next be described in greater detail with reference to the accompanying drawing. Some of the elements of the system are associated with a driving vehicle, for example, the locomotive, the other elements being associated with the driven vehicles, for example, the cars of a train, the division being indicated by the dash-dotted line in the figure. The engine is provided with a current source 1, connected with a variable resistance 3, operated by the engine driver. Lines 5 and 7 lead from current source 1 and variable resistance 3, respectively, to a driven vehicle, which latter is equipped with an armature 13, rotating in the field of a permanent magnet 15. Lines 5 and 7 connect the armature 13 with the current source 1 and the variable resistance 3, respectively. The armature 13 is mechanically connected with a rod 17 which latter is pivotally connected with a tubular portion 19 of a control unit 21 operating as a selflapping valve for an air-braking system. The tubular portion 19 serves as a valve control member and is displaceably disposed in the casing of the control unit 21 and bears a piston 23, which latter is actuated by a pressure spring 24. Piston 23 separates the casing of control unit 21 into an equalizing chamber 25 and a control chamber 27 and intermediate wall 31 separates the latter chamber from an inlet chamber 33. The lower, open end of tubular portion 19 is formed as an outlet seat for valve plate 29, urged by a spring 29a against tubular portion 19. A further seat (inlet seat) 31 is associated with valve plate 29, seat 31 being concentrically disposed about tubular portion 19. When resting on the lower end of tubular portion 19, valve plate 29 separates chamber 27 of the selflapping valve 21 from the outlet opening 35 provided at the upper end of tubular portion 19. Valve plate 29 is adapted to communicate with or separate from one another chambers 27 and 33. Chamber 33 communicates with the train line 39 of the air brake via a conduit 37. Control chamber 27 of the control unit 21 is connected with a chamber 43 via a conduit 41. Equalizing chamber 25 is connected with constant pressure control chamber 47 of a conventional servo-motor-operated, selflapping valve unit 49 via conduit 45. The chambers 43 and 47 are separated from one another by a piston 51 and these three elements define the servo motor. Piston 51 is biased by a spring 53 pertaining to the servo motor as well as to the selflapping valve of unit 49. In its lower end position, illustrated in the drawing, the piston 51 is removed from a valve plate 57, with a central opening 55 of the piston being disposed centrally below plate 57, so that the two chambers 43 and 47 communicate with each other. Valve plate 57 is mounted at the lower end of a rod 59, the other end of which rod projects to the outside of chamber 43 and is connected with a tubular portion 61, the latter being open at either end. The tubular portion 61 is entirely disposed in the interior of the casing of the selflapping valve and can be longitudinally displaced therein by means of piston 79 connected with the tubular portion. The lower, open end 63 of tube 61 leads into a chamber 49a of control valve 49, having an outlet 65. The upper, open end of tube 61 forms a seat for a valve plate 67 influenced by a spring 67a. It is surrounded by a further, concentrically disposed seat 69, also associated with valve plate 67. Seat 67 forms part of an intermediate wall 71 which latter separates the chamber 73 of servo motor operated selflapping valve 49 from a further chamber 75. A spring 77 in chamber 75 actuates piston 79. A conduit 83 connects chamber 75 with a brake cylinder 81. Conduit 85 connects chamber 73 with an auxiliary reservoir 87, the latter communicating with train line 39 via conduit 89 and check valve 91.

The brake system of the driving vehicle is not described in detail; either the same brake system as described above and associated with a driven vehicle or a conventional brake system can be used on the driving vehicle.

The embodiment shown in the figure operates in the following manner: If the brakes are released, the circuit comprising resistance 3 is interrupted and the armature 13 in the magnetic field of permanent magnet 15 is currentless. Consequently, train line 39 has the highest control pressure prevailing also in auxiliary reservoir 87. Through conduit 89 and check valve 91 the pressure in train line 39 is communicated to reservoir 87 and to chamber 33 of selflapping valve 21 via supply line 37.

From inlet chamber 33 the pressure is communicated via open valve 29 to control chamber 27. The latter chamber is connected with chamber 43 of control servo motor operated selflapping valve 49 via conduit 41, the highest control pressure prevailing also in chamber 43. Spring 53 maintains piston 51 in its lower end position so that control chamber 47 is filled with pressure air via valve 55, the same pressure prevailing also in equalizing chamber 25 of control unit 21 via conduit 45. Spring 24 maintains the moveable system comprising tubular portion 19 and piston 23 of control unit 21, in the position shown in the figure, wherein valve 29 is open. Consequently, the armature 13 is kept in its indicated position as it is mechanically coupled with elements 19, 23 and is currentless. Spring 77 in the triple servo motor operated selflapping valve 49 keeps piston 79 and tubular portion 61 in the position shown in the drawing, wherein valve 67 rests on its seat 69, with conduit 85 being separated from conduit 83, whereas the outlets 63, 65 for cylinder 81 are open.

The braking operation is effected as follows: The engine driver adjusts resistance 3 to a certain position, thereby obtaining, at the terminal of the circuit comprising armature 13, a voltage corresponding to this position and, consequently, getting a current flow of the desired intensity in the circuit. The direction of the current in armature 13 and the flow of the magnetic field lines are so chosen that armature 13 is turned in the direction indicated by the arrow in the figure. The thus exerted force is a linear function of the current intensity and, consequently, the moveable system 19, 23 in control unit 21 is moved upwardly in opposition to the influence of spring 24 and also in opposition to the pressure upon piston 23 in equalizing chamber 25. The upward movement is supported by the pressure in control chamber 27, actuating piston 23 as pressure responsive member of this selflapping valve. Due to this displacement of the moveable system 23 valve 29-31 is closed and tubular portion 19 is removed from valve plate 29. Chamber 27 is now separated from train line 39 and is vented via outlet 35. The pressure drop resulting from this venting finally reaches a value at which the constant pressure in equalizing chamber 25 and spring 24 cooperate to move the moveable system 19, 23 into a closing position wherein valve plate 29 comes to rest on the two concentrically disposed seats. This effect is obtained in opposition to the influence of armature 13 and the residual pressure in control chamber 27. The pressure drop in control chamber 27 is communicated via conduit 41 to chamber 43 of the servo motor. Due to the influence of the constant pressure in chamber 47 and the pressure drop in chamber 43 the piston 51 valve plate 57 and stem 59 are moved upwardly, outlet 63 being closed and valve plate 67 being removed from inlet seat 69. The brake cylinder 81 is supplied with pressure air from reservoir 87 via inlet 69 until the pressure building up in chamber 75 and the force of the various springs cause a sealing position in which both valves 67-69 and 67-61 are closed, thereby maintaining the pressure in brake cylinder in the desired value. Due to these operations the power consumption of armature 13 is extremely small. It is thus possible to provide a plurality of armatures connected in parallel or in series without placing too high a load on current source 1.

If the resistance 3 is adjusted so as to raise the voltage and increase the intensity of the current, the force produced by armature 13, turning in the direction of the arrow in the FIGURE is increased correspondingly, thereby unbalancing the control unit 21 and disposing the moveable system 19, 23 upwardly opening outlet 35. As a result, the pressure in control chamber 27 drops again until a new balance is reached, whereupon the moveable system is returned to the sealing position. Simultaneously with the pressure drop in chamber 27 the pressure in chamber 43 of the servo motor is lowered correspondingly, resulting in a pressure increase in brake cylinder 81. It is thus possible to stepwise increase the voltage at the terminals of the circuit comprising resistance 3 and armature 13 and thereby to effect various braking stages with intermediate closing positions up to a full braking. The stroke of the moveable system 19, 23 in the control unit 21 is, in each case, just sufficient to maintain the conditions in the electro-dynamic force-producing unit 13, 15 and to prevent a change in direction of the rotary force exerted on the armature.

By releasing the brake, the current flow is reduced so that the pressure in equalizing chamber 25 and the force of spring 24 cause the moveable system 19, 23 to move downwardly, thereby lifting valve 29 from its seat 31. The pressure air from train line 39 now flows into control chamber 27 through inlet chamber 33 and valve plate 29 remains opened until the pressure increase on piston 23 in control chamber 27 and the force exerted by armature 13 return the system into the position wherein both valves 29-31a and 29-19 are closed. The pressure increase in chamber 27 has been admitted to chamber 43 of the servo motor and has actuated piston 51 so as to move system 61, 79 downwardly, opening outlet 63, until system 61, 79 is returned to the closing position under the influence of the pressure drop in the brake cylinder and the decrease of the force applied to piston 79 in chamber 75. These operations are repeated in case of a further increase of the current intensity until a fully released position is obtained in which piston 51 has opened valve 55, 57. The various elements of the system have now resumed their positions shown in the FIGURE.

The present invention offers considerable advantages over the art. The electro-dynamically operated force-producing unit has an extremely small power consumption and a linear current dependency. The range of rotation of armature 13 can be further increased by providing a collector. The invention is, of course, not limited to the example shown and described, and it can be applied with equal advantage wherever a control force is needed depending on a selected voltage and current intensity. It is, of course, also possible to equip the electro-dynamically operating force-producing unit with electro-magnets instead of permanent magnets. The length of the conductor and its number of windings are, of course, to be adapted to the prevailing operating conditions.

It will be understood that this invention is susceptible to modification in order to adapt it to different usages and conditions and, accordingly, it is desired to comprehend such modifications within this invention as may fall within the scope of the appended claims.

What I claim is:

1. A control system for an air brake comprising: an adjustable electric current source; a permanent magnet producing a constant magnetic field; an electrical conductor electrically connected to said current source and moving in said magnetic field; a tubular element having inlet and outlet; linking means for connecting said conductor to said tubular element for displacement thereof; a pressure vessel housing that portion of said tubular element having said inlet; a spring loaded piston on said tubular element defining a first and a second chamber in said vessel; a stationary duct with valve seat in said vessel defining a third chamber therein communicating with said second chamber, said tubular element with inlet protruding through said duct; a spring loaded valve plate in said vessel for engaging said valve seat and closing said inlet; first, second and third conduit means; a cylinder; a piston displaceably disposed in said cylinder and defining two chambers therein; said first conduit means interconnecting one of said chambers of said cylinder and said first chamber of said vessel, said second conduit means interconnecting the other chamber of said cylinder and said second chamber of said vessel; a pressure line, said third conduit means interconnecting said third chamber of said vessel and said pressure line; and an air brake control valve controllable by said piston in said cylinder.

2. A control system for air brakes comprising: an adjustable electric current supply circuit; an electrical conductor connected to said circuit and rotatable in a constant magnetic field; a self-flapping valve including a pressure responsive member linked to said conductor for common movement, further including inlet, control and equalizing chamber, said equalizing and control members being located at opposite sides of said pressure responsive member, said inlet chamber being connected to a train line; a servo motor for operating a brake valve; a first conduit connected to said control chamber and to one side of said servo motor; and a second conduit connected to said equalizing chamber and to the other side of said servo motor.

3. A control system for air brakes comprising: an adjustable electric current supply circuit; an electrical conductor connected to said circuit; a permanent magnet producing a constant magnetic field, said conductor being rotatable in said field; a selflapping valve including a pressure responsive member linked to said conductor for common movement, further including inlet, control and equalizing chambers, said equalizing and control chambers being located at opposite sides of said pressure responsive member, said inlet chamber being connected to a train line; a servo motor for operating a brake valve; a first conduit connected to said control chamber and to one side of said servo motor; and a second conduit connected to said equalizing chamber and to the other side of said servo motor.

4. A control system for air brakes comprising: an adjustable electric current supply circuit; an electrical conductor connected to said circuit and rotatable in a constant magnetic field; a first selflapping valve including a pressure responsive member linked to said conductor for common movement, further including inlet, control and equalizing chambers, said equalizing and control chambers being located at opposite sides of said pressure responsive member, said inlet chamber being connected to a train line, a servo motor having a piston having a valve seat; a second selflapping valve for operating a brake valve and having a displaceable stem having a valve plate for engaging said valve seat; a first conduit connected to said control chamber and to one side of said piston of said servo motor; and a second conduit connected to said equalizing chamber and to the other side of said piston.

References Cited in the file of this patent

UNITED STATES PATENTS 857,792    Coleman _____ June 25, 1907

FOREIGN PATENTS 1,178,386    France _____ Dec. 8, 1958

OTHER REFERENCES

Moller: German Application 1,029,855, printed May 14, 1958 (KL 20f).